H. A. ORME.
TRANSMISSION GEAR FOR AEROPLANES.
APPLICATION FILED JULY 15, 1911.

1,113,044.

Patented Oct. 6, 1914.

Witnesses

Inventor
H. A. Orme
By
Chas. E. Brock Attorney

UNITED STATES PATENT OFFICE.

HARRY A. ORME, OF WESLEY HEIGHTS, DISTRICT OF COLUMBIA.

TRANSMISSION-GEAR FOR AEROPLANES.

1,113,044.  Specification of Letters Patent.  Patented Oct. 6, 1914.

Application filed July 15, 1911. Serial No. 638,699.

*To all whom it may concern:*

Be it known that I, HARRY A. ORME, a citizen of the United States, residing at Beechwood, Wesley Heights, in the District of Columbia, have invented a new and useful Improvement in Transmission-Gear for Aeroplanes, of which the following is a specification.

This invention relates generally to aeroplanes and more particularly to the transmission gears for transmitting the power of the engine or motor to the propeller shafts, the object being to provide a simple and durable form of transmission which will avoid the crossing of chains, and another object is to provide a form of transmission, which will relieve the power shaft of all lateral strain and a still further object of the invention is to provide for a truss or brace between the power shafts and propeller shafts.

With these objects in view my invention consists in the novel features of construction hereinafter fully described and pointed out in the claim.

Figure 1:
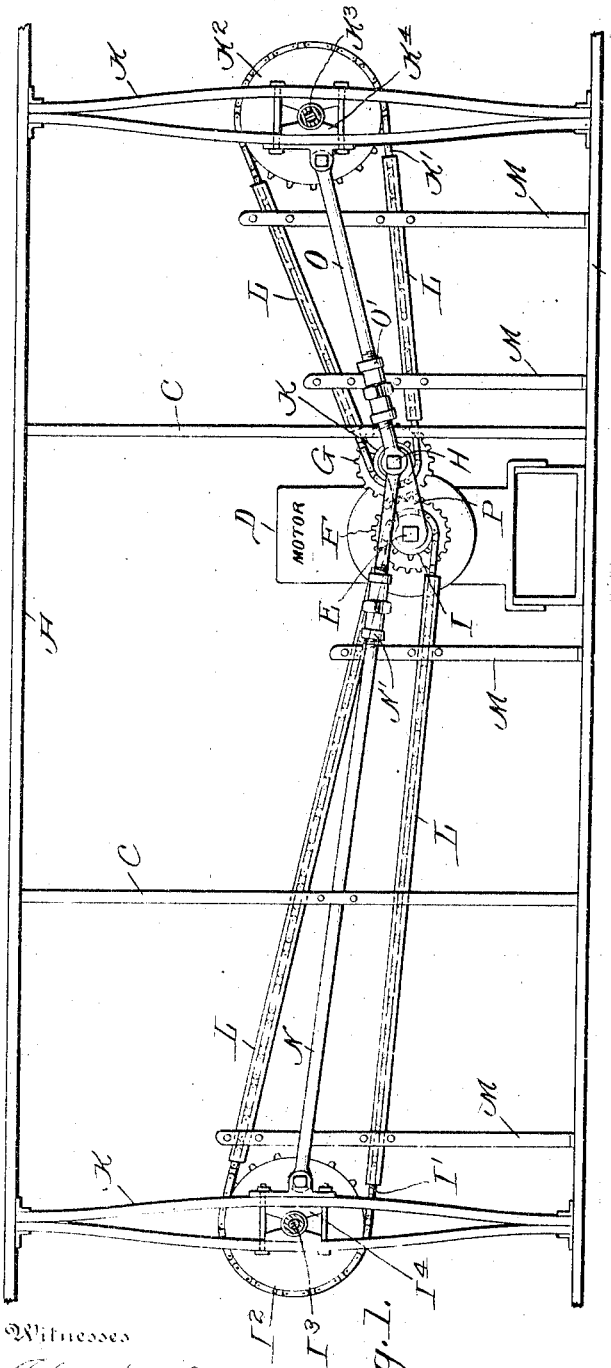
Figure 2:
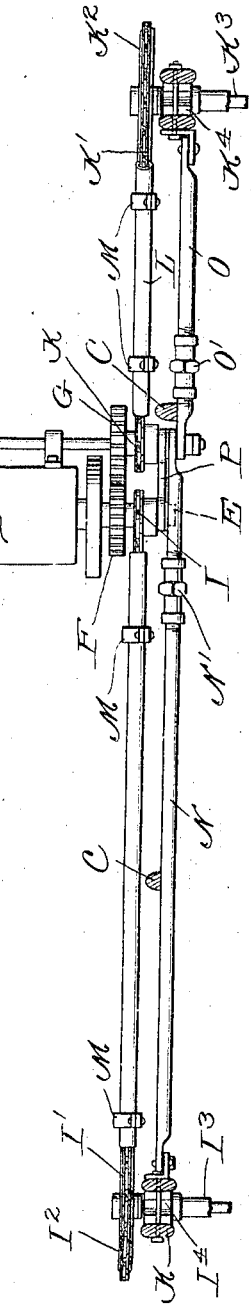

In the drawings forming a part of this specification: Figure 1 is a rear view of a portion of an aeroplane embodying my improved construction of transmission, and, Fig. 2 is a top plan view of the same.

Referring to the drawings, A, indicates the upper plane and B, the lower plane, and C, are the wooden brace rods connecting the upper and lower planes.

D, indicates the motor which may be of any desired construction and from which extends the main drive shaft E, carrying a pinion F, which meshes with a pinion G, mounted upon the rear end of a shaft H, which is mounted in suitable bearings upon the side of the motor.

I, indicates a sprocket mounted upon the drive shaft and K, indicates a similar sprocket mounted upon the shaft H, and passing over these sprockets I, and K, respectively, are the drive chains I', and K', respectively, which pass around sprockets I², and K², which are mounted upon the forward ends of the propeller shafts I³, and K³, said shafts being journaled in bearings I⁴, and K⁴, respectively, held between the trussed brace rods K, which are connected to the upper and lower planes as shown. The sprocket chains travel in tubes L, which are supported by means of suitable braces M, said tubes serving to incase or envelop the chains and thereby preventing anything coming in contact therewith. In order to take the strain off the power shafts and also to brace the propeller shafts in connection with said power shafts, I employ truss rods N, and O, the truss rod N, extending from the braces K, upon the left hand side to the end of the rotary shaft H, and the truss rod O, extends from the trussed brace K upon the right hand side of the machine to the end of the shaft H, and turn-buckles N', and O', are employed to secure the proper tension and in addition to these features, I employ a link P, which extends from the rear end of the power shaft E, to the end of the shaft H, said link serving to hold these two shafts properly spaced and prevent any strain being communicated thereto.

Most of the motors now in use are what are known as right hand motors but this machine is a left hand drive and it will be noted that by the employment of this particular form of transmission I completely avoid the crossing of the chains and furthermore the brace rods of the parts at various points can relieve the main drive and supplemental drive shafts of all lateral strain.

It will thus be seen that I provide a simple and efficient form of transmission capable of carrying out all of the objects hereinbefore referred to.

Having thus fully described my invention, what I claim as new and desire to secure by Letters Patent, is:

In an aeroplane, the combination with the propeller shafts, of vertical supporting braces to which said shafts are connected, a power shaft having a gear thereon, a second shaft parallel therewith and provided also with a gear, said gears intermeshing, sprockets carried by the power and second shaft and also by the propeller shafts, sprocket chains passing around said sprockets, a link connecting the ends of the power and second shaft, an adjustable truss rod extending from the end of the second shaft to the support for a propeller shaft, and a second adjustable truss rod extending from the end of the second shaft to the opposite support for a propeller shaft, all of said parts being combined and arranged substantially as herein shown and described.

HARRY A. ORME.

Witnesses:
CHAS. E. BROCK,
PERCY H. MOORE.